United States Patent [19]

Kawauchi

[11] Patent Number: 4,600,996

[45] Date of Patent: Jul. 15, 1986

[54] ARRANGEMENT FOR INSPECTING CIRCUIT PATTERNS DRAWN ON A MASK

[75] Inventor: Yasunobu Kawauchi, Tokyo, Japan

[73] Assignee: Toshiba Kikai Kabushiki Kaisha, Tokyo, Japan

[21] Appl. No.: 532,511

[22] Filed: Sep. 15, 1983

[30] Foreign Application Priority Data

Sep. 28, 1982 [JP] Japan ................... 57-169377

[51] Int. Cl.⁴ ............... G06F 15/46; B41B 41/00
[52] U.S. Cl. ..................... 364/491; 250/492.2
[58] Field of Search .......... 364/488, 489, 490, 491, 364/520; 250/448, 394, 398, 237, 492.2, 492.3; 358/101, 106

[56] References Cited

U.S. PATENT DOCUMENTS

| | | | |
|---|---|---|---|
| 3,670,153 | 6/1972 | Rempert et al. | 364/491 X |
| 3,881,098 | 4/1975 | Rich | 364/520 X |
| 4,117,340 | 9/1978 | Goto et al. | 364/520 X |
| 4,163,309 | 8/1979 | Stickler | 364/520 X |
| 4,218,142 | 8/1980 | Kryger et al. | 356/394 |
| 4,267,456 | 5/1981 | Hidai et al. | 250/492.2 |
| 4,280,186 | 7/1981 | Hidai et al. | 250/492.3 X |
| 4,305,097 | 12/1981 | Doemens et al. | 364/491 X |
| 4,387,433 | 6/1983 | Cardenia et al. | 250/492.2 X |
| 4,433,384 | 2/1984 | Berrian et al. | 250/492.2 X |
| 4,465,350 | 8/1984 | Westerberg | 364/491 X |

*Primary Examiner*—Edward J. Wise
*Attorney, Agent, or Firm*—Cushman, Darby and Cushman

[57] ABSTRACT

A mask inspection arrangement is disclosed including a magnetic disc memory for storing pattern data which has been used for operating a mask drawing apparatus, a data producing device for optically scanning a mask drawn by the mask drawing apparatus and producing measured data indicative thereof, a data converter for converting the pattern data from memory into a reference data in the form of dot pattern data for blanking an electron beam in the mask drawing apparatus, and a comparator for comparing the measured data with the reference data and determining a correlation therebetween.

12 Claims, 6 Drawing Figures

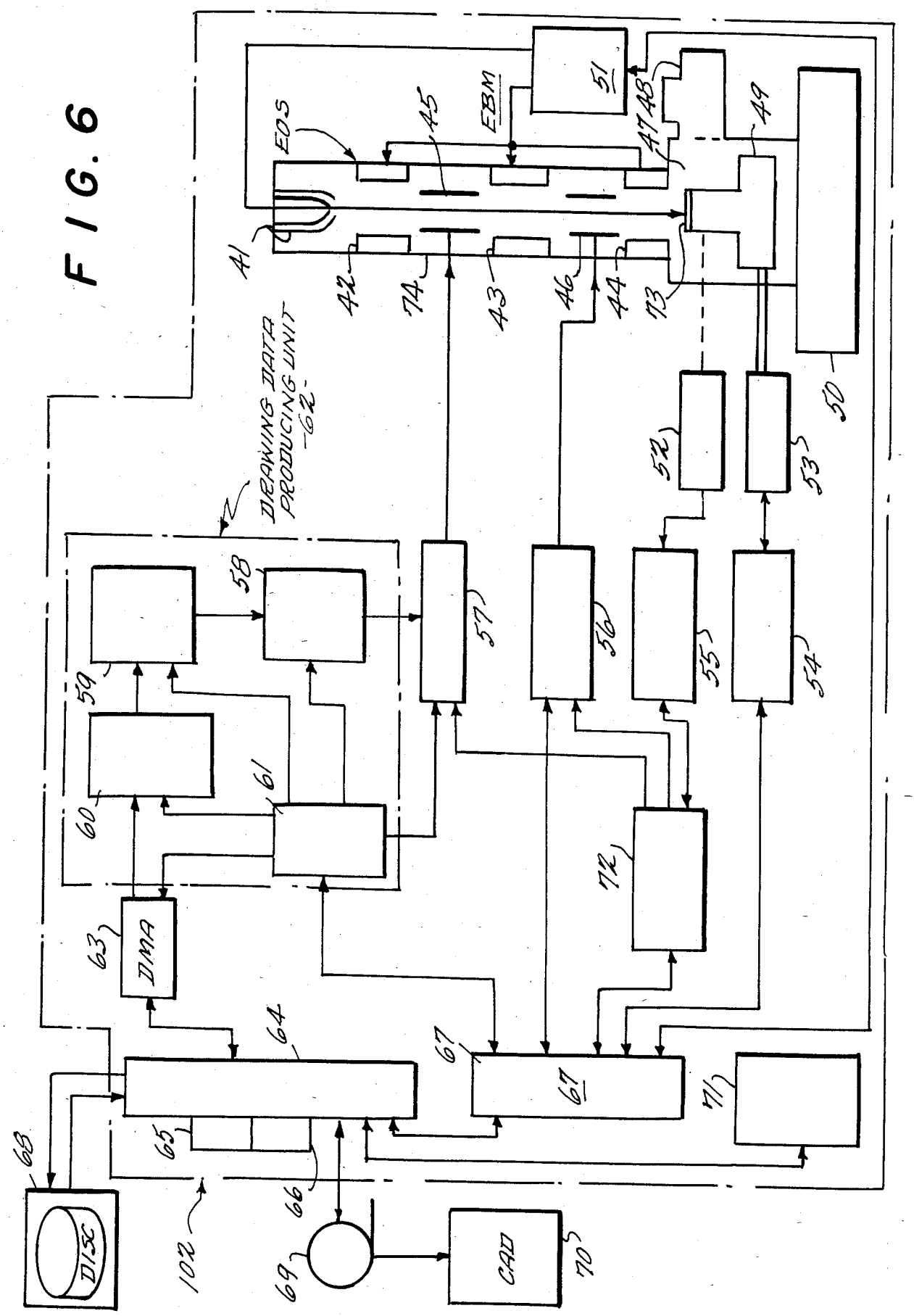

ARRANGEMENT FOR INSPECTING CIRCUIT PATTERNS DRAWN ON A MASK

BACKGROUND OF THE INVENTION

1. Field of Invention

The invention relates in general to integrated circuit manufacture. More specifically, the invention is directed to a method and an apparatus for inspecting a mask for an integrated circuit.

2. Description of the Prior Art

Mask drawing apparatus are used to draw circuit patterns for large scale integrated (LSI) circuits by using electron beams. Mask inspection apparatus are used to inspect whether the circuit patterns are correctly drawn by the mask drawing apparatus.

Various arrangements for drawing the circuit patterns and inspecting them have been independently developed by different LSI manufacturers. Thus, a user of mask drawing apparatus and mask inspection apparatus may buy them from different manufacturers.

As a result, there is often an incompatibility problem. The pattern data format used for operating the mask inspection apparatus may be different from the pattern data format being used for operating the mask drawing apparatus. To address this problem many users have a data conversion process or system through which the pattern data used for the mask inspection apparatus may be produced from either a CAD system (*C*omputer *A*ided *D*esign) which produces the pattern data for mask drawing, or from the pattern data used for the mask drawing apparatus.

FIG. 1 (PRIOR ART) illustrates a known system including a mask drawing apparatus and a mask inspection apparatus. This system requires a data conversion process or system as discussed above. CAD system 1 produces a data group in a CAD format, which corresponds to a circuit pattern 8. Circuit pattern 8 is stored on a magnetic tape 9.

A computer 2 converts the data group stored on magnetic tape 9 into pattern data having a format (A) used for a mask drawing apparatus 4. The pattern data is stored on a magnetic disc memory 3 having a large memory capacity.

The data group having CAD format stored on magnetic tape 9 is converted by a data conversion system 7 to pattern data having a format (B) used for a inspection apparatus 6, which detects defects of circuit patterns drawn on a mask. The converted pattern data is stored on a magnetic disc memory 5.

With increasing density of LSI circuits, masks for the LSI circuits and the reticles, on which an original circuit pattern figure is magnified, are being produced using electron beam drawing apparatus. When using an electron beam drawing apparatus, it is necessary to adopt a data format in which a larger data compression rate than that used in known processes is utilized. This requires a memory capacity sufficient to store a unit figure, such as for example a circle or a trapezoid. This capacity can be smaller as the degree of integration for an LSI circuit pattern increases. A data format known as "trapezoid format" has been used as a pattern data format for operating electron beam drawing apparatus.

In using an electron beam drawing apparatus (hereinafter referred to as an "EB" apparatus) as a mask drawing apparatus, magnetic disc memory 3 stores pattern data having a trapezoid format (the trapezoid format is hereinafter, also called "EB format") as the format (A) data shown in FIG. 1.

In the case of converting pattern data having format (A) (here corresponding to EB format), a pattern data having format (B) is used. Data conversion system 7 includes hardware and software for data conversion interposed between disc memory 3 and disc memory 5. System 7 needs additional time for operating format conversion of pattern data than would be required without such format conversion.

Also, format conversion through data conversion system 7 may produce some errors in the process of converting because of added system complexity, as compared with a system wherein formats A and B are similar.

Thus, in the case of the process of converting CAD format data stored on magnetic tape 9 to pattern data having format (B) through system 7, the conversion process itself requires too much time.

SUMMARY OF THE INVENTION

The present invention thus provides a method and apparatus for inspecting a drawn mask by utilizing pattern data used for drawing the mask to inspect the finished product. Pattern data used to draw the mask is stored in a memory such as, for example, a magnetic disc memory. This data is recalled and compared with data generated by optically scanning the finished product.

The method and apparatus of the invention eliminate the data conversion system required in known systems which may produce errors during the process of data conversion. Eliminating the data conversion system saves time necessary for converting one format of a pattern data to another format.

The method and apparatus of the invention reflect the inventor's recognition that there are some time-intervals between the time when drawing on a photo mask terminates and the time when inspecting the drawn mask begins. A mask on which drawing has just finished must be processed through some chemical treatment before it is inspected.

The invention takes advantage of this interval of time. The present invention provides a novel mask inspection apparatus which comprises a memory for storing pattern data used for operating a mask drawing apparatus in which pattern data is converted from CAD format data, a measured data producing device for producing measured data by means of optically or electrically scanning a mask drawn by the drawing apparatus, a data conversion device for converting the pattern data to a reference data, and a comparing device for comparing the measured data with the reference data.

BRIEF DESCRIPTION OF THE DRAWINGS

System Arrangements

The presently preferred embodiment, constituting the best mode of practicing this invention known to the inventor at the time of filing of the application for this patent, will be described in further detail with reference to the drawings, wherein like numerals represent like or corresponding elements and wherein:

FIG. 6 shows an electron beam mask drawing apparatus as used in the present invention.

DETAILED DESCRIPTION OF THE PREFERRED EMBODIMENTS

Figure 2:
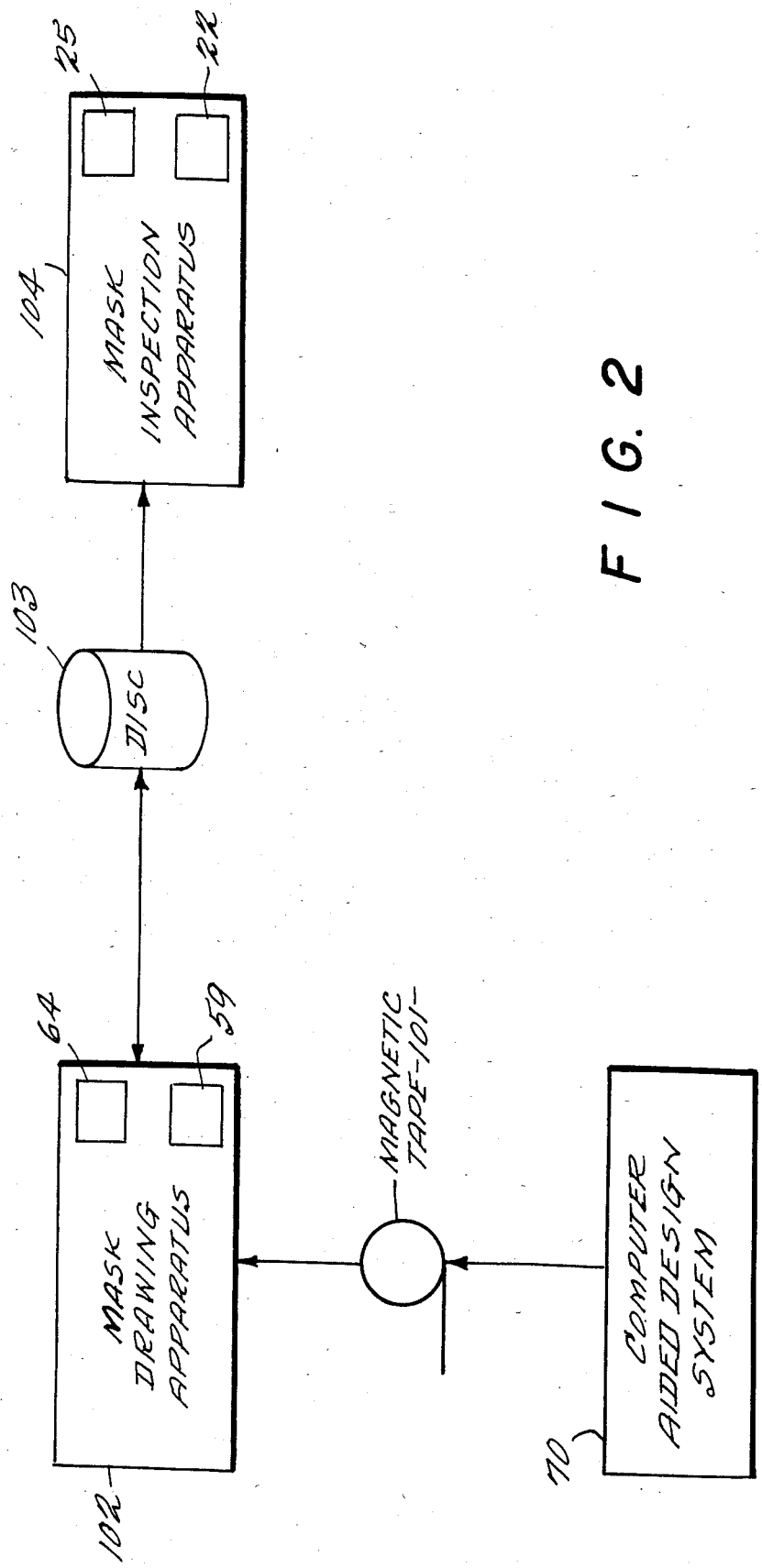
FIGS. 2, 3 and 4 illustrate various combinations according to the present invention of mask drawing and inspection devices and magnetic disc memories storing pattern data.
Figure 3:
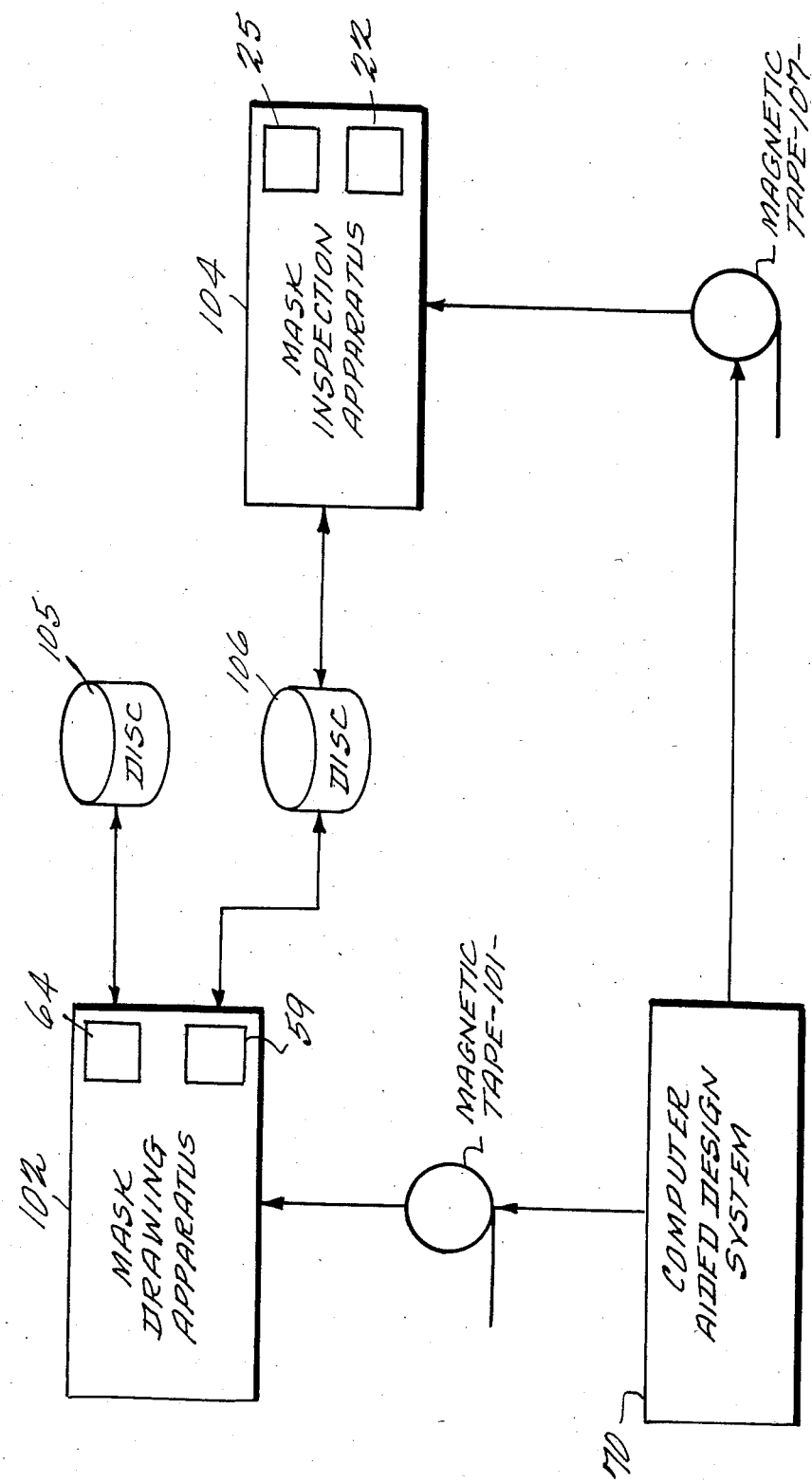
Figure 4:
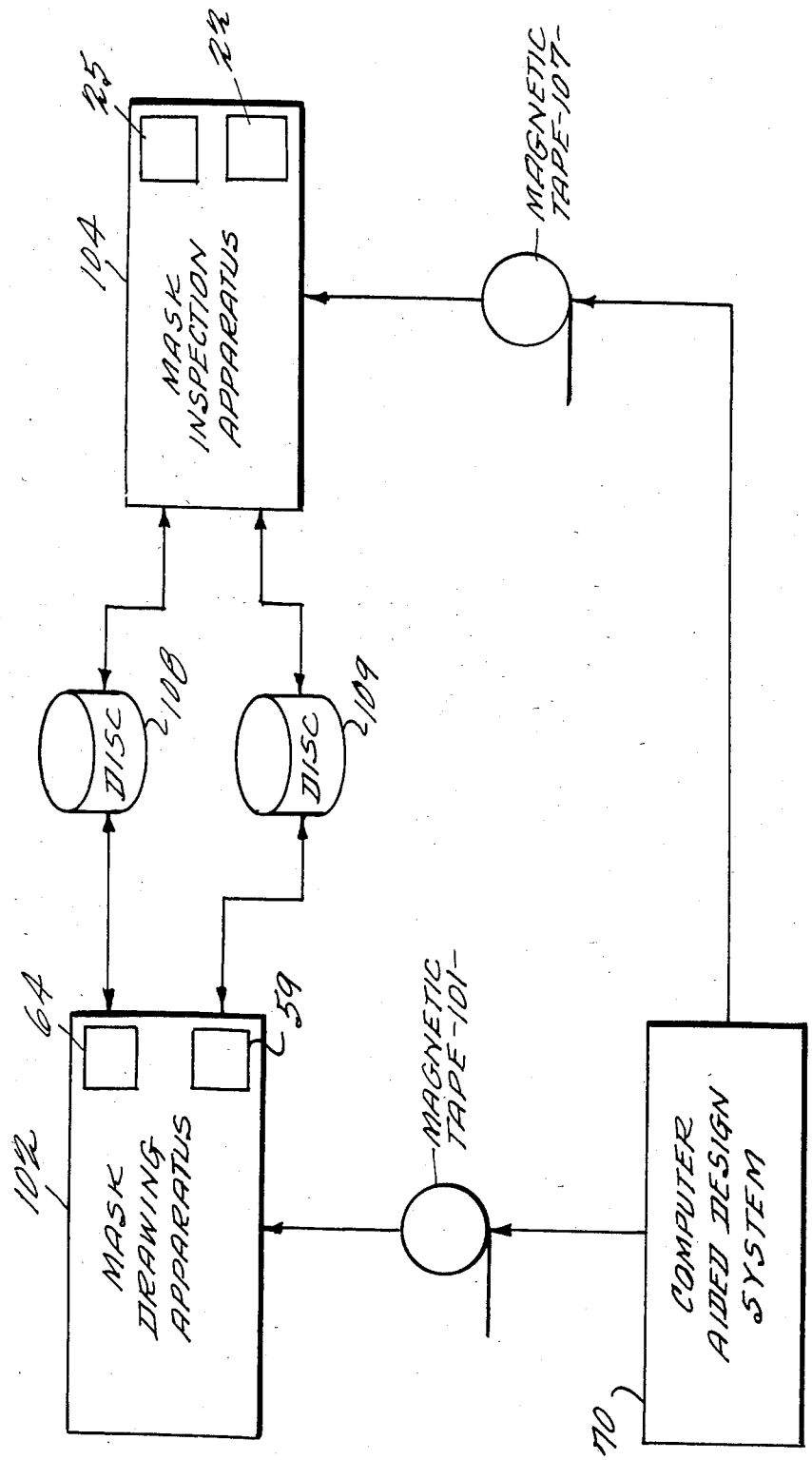

FIGS. 2, 3 and 4 illustrate various combinations of devices according to the present invention. They utilize a magnetic disc memory for storing pattern data for both inspection and mask drawing apparatus.

In the FIG. 2 system, a computer aided design system 70 produces CAD format data which is stored on a magnetic tape 101. A mask drawing apparatus 102 includes a computer 64 for converting CAD format data read from magnetic tape 101 into pattern data. This pattern data is, in turn, stored in a magnetic disc memory 103 by operating a format conversion program of computer 64. The pattern data stored in magnetic disc memory 103 is converted into dot pattern data by operating computer 64 and a converter 59 in mask drawing apparatus 102, and a mask drawing operation is executed.

A mask drawn by mask drawing apparatus 102 is subjected to some kind of chemical treatment. It is then mounted on a table of a mask inspection apparatus 104. During the chemical treatment a computer 25 reads out the pattern data from magnetic disc memory 103, which has already been used for the mask drawing operation of mask drawing apparatus 102. The read out pattern data is converted into "reference" data in a circuit 22 (similar to converter 59) of mask inspection apparatus.

FIG. 3 illustrates another system arrangement according to the present invention. This system includes including two magnetic disc memories 105 and 106, and two magnetic tapes 101 and 107 which store CAD format data produced in advance by a CAD system 70. Computer 64 converts CAD format data stored in a magnetic tape 101 into pattern data by operating its format conversion program, and stores it in magnetic disc memory 105. Then, mask drawing apparatus 102 operates to draw a circuit pattern on a mask by converting pattern data stored in magnetic disc memory 105 into dot pattern data. Computer 64 also transfers the pattern data previously stored an magnetic disc memory 105, to another magnetic disc memory 106. Time intervals necessary for transferring pattern data are very small compared with that of converting CAD format data stored on magnetic tape 101 into pattern data stored in magnetic disc memory 105. The transferred pattern data stored in magnetic disc memory 106 is used for mask inspection in a mask inspection apparatus 104.

Computer 64 may read out again, by operating its format conversion program, another CAD format data corresponding to another mask pattern from magnetic tape 101 and convert it into pattern data and store it in magnetic disc memory 105 while the mask inspection apparatus operates.

Alternatively, computer 25 converts, by operating its format conversion program, CAD format data stored in a magnetic tape 107 into pattern data and stores it in magnetic disc memory 106. Then, computer 64 transfers the pattern data being stored in magnetic disc memory 106 to disc memory 105. In short, pattern data applied to mask inspection apparatus 104 for mask inspection is stored in magnetic disc memory 106 by transferring it from magnetic disc memory 105 or by converting CAD format data from magnetic tape 107. Priority for operating each operation program stored in computer 64 or 25 is predetermined to avoid conflict in access to magnetic disc memories 105 and 106. Computer 64 is higher in priority than computer 25 because it is impossible for computer 25 to access magnetic disc memory 105. Computers 64 and 25 also operate to convert CAD format data stored in magnetic tape 101 and 107 into pattern data and to store them in magnetic disc memory 105 and 106 as a background job, as well as operate to draw circuit pattern figure on a mask and inspect it as a foreground job.

FIG. 4 illustrates a more flexible system alternative as compared with the FIGS. 2 and 3 systems. Mask drawing apparatus 102 and mask inspection apparatus 104 may receive pattern data from either a magnetic disc memory 108 or 109. To accomplish the flexibility of pattern data reception, priority concerning selections between magnetic disc memory 108 and 109 is predeterminedly defined in operation programs of computers 64 and 25. Therefore, CAD format data stored in magnetic tapes 101 and 107 may be stored in either of magnetic disc memory 108 or 109 by operating format conversion programs in either computer 64 or computer 25.

In the case that pattern data (1) corresponding to CAD format data (1) is stored in magnetic disc memory 108, CAD format data (2) stored in magnetic tape 107 is converted into pattern data (2) by computer 25, which in turn is stored in magnetic disc memory 109.

Pattern data (1) stored in magnetic disc memory 108 is transferred to mask drawing apparatus 102 for drawing circuit patterns on a mask, and after chemical treatments, the drawn mask is mounted on mask inspection apparatus 104.

The pattern data stored in magnetic disc memory 108 is transferred to mask inspection apparatus 104 for inspecting the drawn mask under the control of computer 25. Pattern data stored in magnetic disc memory 109 is transferred to mask drawing apparatus 102 under the control of computer 64 and is used for drawing next circuit patterns on a mask. After drawing on the mask information stored in magnetic disc memory 109 is transferred to mask inspection apparatus 104 for inspection of the mask under the control of computer 25.

Computer 25 reads out CAD format data corresponding to still another pattern data from magnetic tape 101 and converts it into pattern data which in turn is stored in magnetic disc memory 108 while computer 25 operates appropriately for inspecting the mask.

By sequentially processing mask drawing and mask inspecting as mentioned above, the system constitution illustrated in FIG. 4 may accomplish to a significantly production efficiency than was possible with known systems.

Mark Inspection Apparatus (MI)

Figure 5:
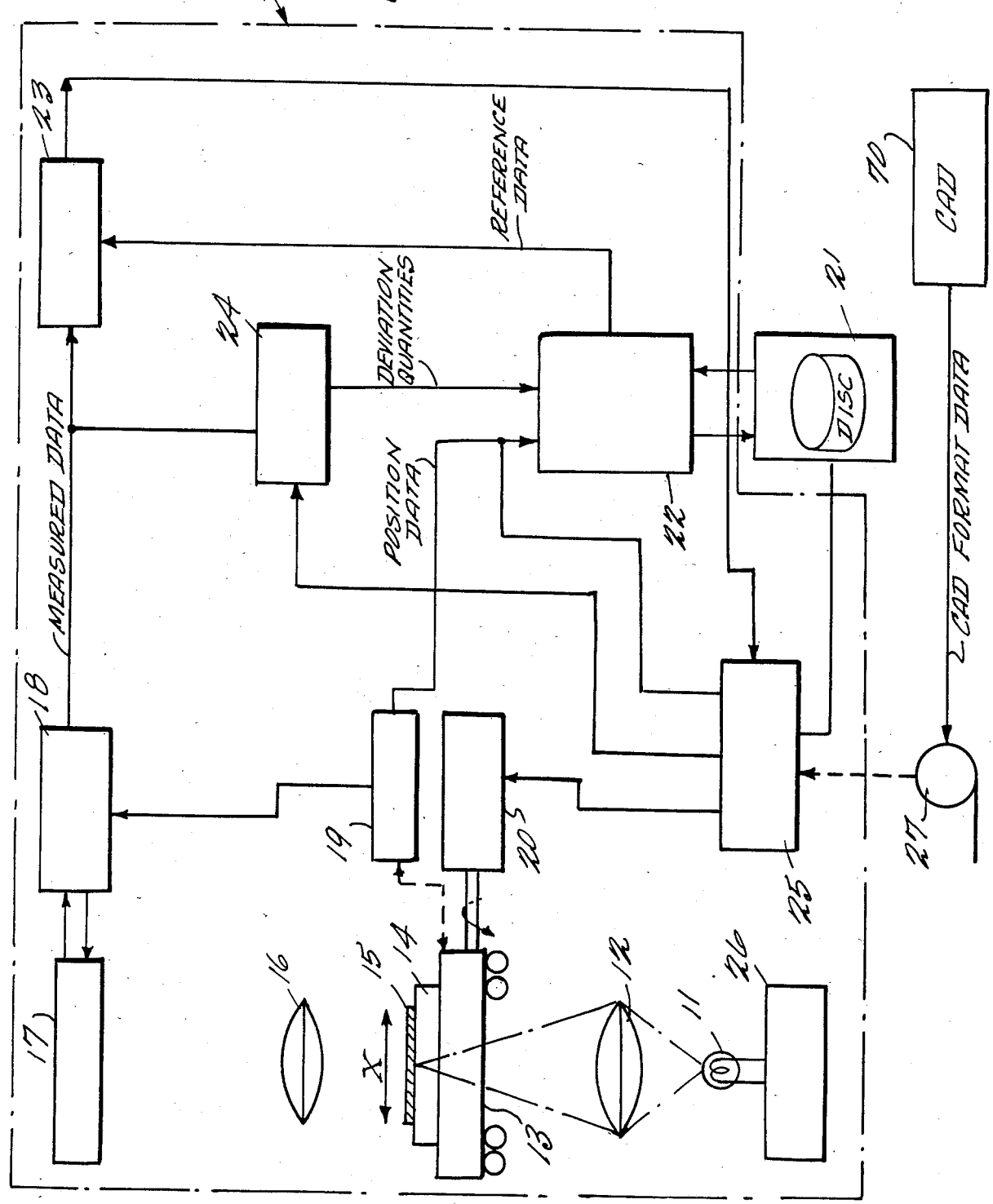
FIG. 5 is a block diagram of a mask inspection arrangement as used in the present invention.

FIG. 5 is a block diagram of a mask inspection apparatus 104. A light source 11 connected with a power source 26 provides light, which is focused by a focusing lens 12, on a mask pattern 15 drawn on a mask 14 fixedly mounted on a X-Y table 13 of mask inspection apparatus 104. Mask pattern 15 focuses into an image through an objective lens 16 onto a diode sensor 17.

Diode sensor 17, excited by a sensor driving circuit 18, measures transmission light quantity at each point of a width on mask pattern 15 equal to a sensitive area of diode sensor 17 in the direction of axis X.

For measuring whole areas of mask pattern 15, X-Y table 13 is continuously moved in increments of a predetermined length in the direction of a Y axis perpendicular to X axis by means of a table driving circuit 20 controlled by computer 25. After scanning a first area having the width and the predetermined length on the mask pattern 15, X-Y table 13 is moved by the predetermined width to the direction of X axis for scanning a second area on mask pattern 15. Sensor driving circuit 18 converts a signal detected by diode sensor 17 to a digital signal, and transmits it to a judging circuit 23 and a deviation detecting circuit 24.

A position detecting circuit 19 for detecting X and Y position of X-Y table 13 comprises, for instance, a laser interferrometer. Position detecting circuit 19 operates in synchronism with sensor driving circuit 18 and also applies each detected position data, which corresponds to light transmission quantity data detected at each point of the sensitive area on diode sensor 17, to circuit 22 for producing reference data for judging circuit 23 and deviation detecting circuit 24. Before detecting by using diode sensor 17, computer 25 converts CAD format data stored in a magnetic tape 27, which has been transferred from computer aided design system 70, into a pattern data having a trapezoid format, for instance, and stores it in a magnetic disc memory 21.

Circuit 22 reads out a portion of the pattern data in accordance with detected position data inputted by position detecting circuit 19 from magnetic disc memory 21, and produces a reference data used for judging circuit 23 and deviation circuit 24. Based on a difference between the reference data and detected data, judging circuit 23 produces data representing a discord among this data, and applies them to computer 25. Computer 25, in turn edits a group of data representing discord and stores this group as information concerning mask defects in a predetermined memory area of magnetic disc memory 21.

Deviation detecting circuit 24 detects deviation quantities for each X and Y directions from the detected data and the reference data, and applies the quantities to circuit 22. Circuit 22, in turn compensates a portion of pattern data to be actually read out from magnetic disc memory 21 in accordance with the deviation quantities.

Mask Drawing Apparatus (MD)

FIG. 6 is a block diagram of mask drawing apparatus 102 as used in the present invention. In the right portion of FIG. 6, there is provided an electron beam drawing machine EBM which includes a vibration isolating support 50, mask drawing room 47, an electro-optical system EOS, and a mask reserving room 48.

In mask drawing room 47, there is an X-Y table 49 on which a mask blank 73 to be drawn upon is fixedly located. X-Y table 49 is movable to the directions of axes X and Y.

Electro-optical system EOS comprises a cylinder 74 which provides an electron gun 41 for emitting an electron beam to mask 73 at the top portion of its inner side.

Under electron gun 41 in cylinder 74, the emission strength of which is controlled by a power controller 51, there are mounted on a first condensing lens 42, a second condensing lens 73 and an objective lens 44.

Strengths of each electric field near those lenses 42, 43 and 44 are controlled, respectively by signals from power controller 51.

Between first condensing lens 42 and second condensing lens 42, there is mounted a blanking electrode 45, and also between second condensing lens 42 and objective lens 44, there is mounted a deflection electrode 46.

Blanking electrode 45 blanks the beam emitted from electron gun 41 so that it will not to reach the drawing area of mask blank 73 in accordance with a signal from a circuit 57 which reads out dot data defining the pattern to be drawn from drawing data producing unit 62. Deflection electrodes 46 controlled by a deflection control circuit 56, deflects the electron beam for moving it to the direction of axis X and flying it back during one scanning, the width of beam movement on mask 73 corresponding to the width mentioned above in relating to diode sensor 17. Numeral 53 designates a driving mechanism for moving X-Y table 49 in the direction of the X and Y axes, thereby mask 73 on the table being moved in the fashion of raster scan.

Numeral 54 designates a drive circuit for driving mechanism 53. Numeral 52 designates a laser interferrometer connected to a position detecting circuit 55, which produces signals with respect to X and Y positions of mask 73 mounted on X-Y table 49.

Drawing data producing unit 62 comprises a pattern data memory 60 which receives some groups of pattern data through a computer 64 and a direct memory pattern data through a computer 64 and a direct memory access unit (DMS) which operates to transfer pattern data from magnetic disc memory 68 to memory 60, a converter 59 which converts unit pattern data defining one trapezoid figure into a group of dot pattern data, a dot pattern data memory 58, and a control unit 61 for controlling the operations of pattern data memory 60, DMA 63, converter 59, dot pattern memory 58 and circuit 57 for smoothly executing pattern data conversion to dot pattern data and reading them out.

Numeral 65 designates a control program necessary for operating a system of computer 64, and numeral 66 designates a format conversion program for converting CAD format data being stored in magnetic tape 69, which is produced by CAD system 70, into pattern data (EB format) stored in magnetic disc memory 68, which is used for drawing the mask 73.

Numeral 67 designates an interface unit connected with computer 64, controller 61, deflection control circuit 56, drive circuit 54 and a synchronized signal producing unit 72 from which a clock signal for timing is applied to circuit 57, deflection control circuit 56 and position detecting circuit 55. Numeral 71 designates a console unit handled by an operator.

The pattern data having EB format stored in magnetic disc memory 68 comprises a number of the unit pattern data defining a trapezoid suitable for electron beam drawing machine EMB operated with a raster scanning mode. More detail of the pattern data and its conversion to dot pattern data is disclosed in the specification of Japanese patent laid open No. 55-9433.

Before drawing operation starts, a drawing start position on mask 73, a key marking position, the value of scaling factor and beam emission quantity are applied to computer 64 from console unit 71, so that computer 64 and its control program 65 define a diameter of the beam, beam current values, a deflection width, moving speeds of X-Y table 49 and a rate of division, then a mask drawing operation begins to draw.

The arrangement of a mask inspection apparatus (MI) 104 and a mask drawing apparatus (MD) 102 have been described, and as shown in FIGS. 5 and 6, in memory 68 and memory 21, there are stored common or same pattern data having a trapezoid format which is called "EB format".

In mask inspection apparatus 104, pattern data stored in memory 21 is converted into a modified dot pattern data as reference data applied to judging circuit 23, and in mask drawing apparatus 102, pattern data stored in memory 68 is converted into dot pattern data applying to electro-optical system EOS of electron beam drawing machine EBM. Both apparatuses provide circuit 22 or converter 59 for converting pattern data into dot pattern data, respectively.

Circuit 22 and converter 59 execute substantially the same functions or operations from the point of view of data conversion. It is preferable that pattern data stored in memory 21 and memory 68 are the same data format, and that they are commonly used as described with reference to FIGS. 2, 3 and 4.

The invention advantageously functions to commonly make use of the same memory, in which a pattern data is stored, for both of mask drawing and mask inspection apparatuses.

The esssence of the invention, the technical idea of commonly making use of the memory, covers both of fashions for transferring the pattern data to a mask drawing apparatus and a mask inspection apparatus, the one corresponding to transfer the pattern data from physically the same memory device to the apparatuses respectively, as shown in FIGS. 2 and 4, and the other corresponding to transfer the pattern data from a plurality of the memory devices, between which the pattern data is transferred, to the apparatuses, as shown in FIG. 3.

Figure 1:
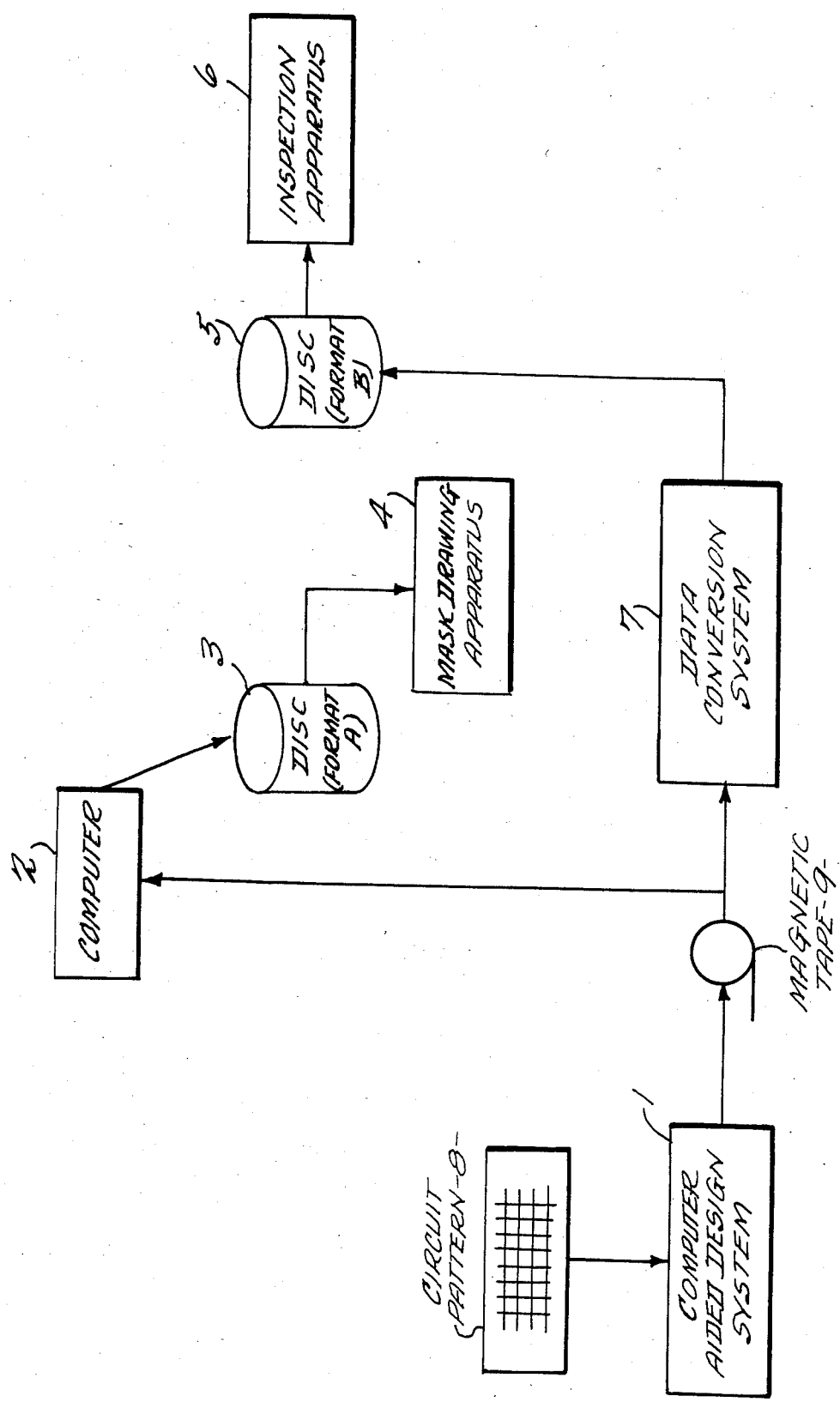
FIG. 1 (PRIOR ART) is a block diagram showing known CAD system including mask drawing and mask inspection devices.

According to the invention, as data conversion system or process 7 shown in FIG. 1 is eliminated, it is advantageous for the users of mask drawing and mask inspection apparatuses, the process from mask drawing to mask inspection becomes short and simple, errors occurring in format conversion of the process are eliminated, and therefore chips of LSI circuits can be produced at lower cost and much faster than before. Moreover, in case that the circuit for converting pattern data into reference data in a mask inspection apparatus substantially equals to the converter of a mask drawing apparatus. It is advantageous that manufacturers of a mask inspection apparatus need not prepare programs necessary for format conversion because of commonly making use of a memory device storing pattern data therein.

Though the mask inspection apparatus shown in FIG. 5 is provided with an optical scanning device, the invention is not limited to it, and also though the mask drawing and inspection apparatuses is provided with X-Y tables moving continuously to the direction of axis Y, as called "raster scanning", the invention is not limited to the raster scanning. In a short, the present invention is applicable to a combination of mask drawing and inspection apparatuses of the type which executes drawing by using dot pattern data for blanking beams (though not limited to electron beam), which is converted from pattern data, then produces measured data by scanning the drawn mask, and at the same time produces a reference data for comparing them each other for judging the existence of mask defects.

Thus, while the present invention has been herein described in what is presently conceived to be the most preferred embodiments thereof, it will be understood to those in the art that many modifications may be made hereof within the scope and spirit of the present invention, which scope is to be accorded the broadest interpretation of the appended claims so as to encompass all equivalent methods and apparatuses.

What is claimed is:

1. A system for inspecting a circuit pattern drawn on a mask comprising:
   mask drawing apparatus means for drawing a circuit pattern on said mask;
   memory means for storing pattern data used by said mask drawing apparatus means;
   means for generating measured data corresponding to said circuit pattern drawn on said mask;
   means for reading said pattern data from said memory means and generating reference data indicative thereof; and
   means for comparing said measured data with said reference data and determining a correspondence therebetween, thereby determining whether the pattern on said mask corresponds to the pattern defined by said memory means and intended to be drawn on said mask.

2. A system according to claim 1 wherein said storing means comprises a magnetic disc.

3. A system according to claim 1 wherein said generating means comprises means for optically inspecting said mask.

4. A system according to claim 1 wherein said stored pattern data is generated by a computer-aided design system.

5. An arrangement for inspecting a mask comprising:
   memory means for storing pattern data which is used for drawing a circuit pattern on said mask;
   a computer aided design system;
   an electron beam drawing machine means for controlling blanking operation of an electron beam applied to the mask, including an electro-optical system;
   a mask drawing apparatus including: (a) a computer having a data conversion program for converting CAD format data from said computer aided design system into said pattern data to be stored in said memory means, and (b) converter means for converting said pattern data into dot pattern data for application to said electro-optical system of said electron beam drawing machine means;
   a mask inspection apparatus including: (a) means for generating measured data corresponding to the pattern formed on said mask by said mask drawing apparatus, and (b) means for reading said pattern data from said memory means and generating a reference data indicative thereof; and
   means for comparing said measured data with said reference data and determining a correspondence therebetween, thereby determining whether the pattern on said mask corresponds to the pattern intended to be drawn on said mask.

6. An arrangement according to claim 5 wherein said memory means comprises a magnetic disc.

7. An arrangement for inspecting a mask comprising:
   first memory means for storing pattern data which is used for drawing a circuit pattern on said mask;
   second memory means for storing pattern data which is used both for drawing and inspection;
   electron beam drawing machine means for controlling blanking operation of an electron beam on the mask, said electron beam drawing machine including an electro-optical system;

a mask drawing apparatus including: (a) a computer having a data conversion program for converting CAD format data from a computer aided design system into said pattern data to be stored in said first and second memory means, and (b) converter means for converting said pattern data stored in said memory means into dot pattern data for application to said electro-optical system of said electron beam drawing machine means; and a mask inspection apparatus including: (a) a computer having a data conversion program for converting CAD format data from said computer aided design system into said pattern data stored in said second memory means, (b) means for generating measured data corresponding to the pattern formed on said mask by said drawing apparatus, and (c) means for reading said pattern data from said second memory means and generating reference data indicative thereof; and means for comparing said measured data with said reference data and determining a correspondence therebetween, thereby determining whether the pattern drawn on said mask corresponds to the pattern intended to be drawn on said mask.

8. An arrangement according to claim 7 wherein said first and second memories each comprise a magnetic disc.

9. An arrangement according to claim 7, wherein said computer in the mask inspection apparatus is connected to said first memory means, said computer thereby being able to access to both of said first and second memory means, and said reading and generating means being able to be applied from both of said first and second memory means.

10. A method for inspecting circuit patterns drawn on a mask by a mask drawing apparatus, said mask being mounted on a mask inspection apparatus of the type which comprises memory means for storing a pattern data which has been used for said mask drawing apparatus, data producing means for producing a measured data by means of optically or electrically scanning a mask drawn by said mask drawing apparatus, a data converting means for converting the pattern data into a reference data, and comparing means for comparing the measured data with the reference data, comprising the steps of:

mounting said drawn mask on said mask inspection apparatus;

converting said pattern data in said memory means ino reference data which is used in said mask inspection apparatus;

producing said measured data to be compared with said reference data by operating said mask inspection apparatus; and comparing said measured data with said reference data, and forming a signal indicative of defects on the drawn mask when the divergence between said measured and said reference data exceeds a predetermined amount.

11. In the method as in claim 10, said mask inspection apparatus having a first memory means and said mask drawing apparatus having a second memory means for storing said pattern data, said converting step further comprising the steps of, transferring said pattern data being stored in said second memory means to said first memory means used for mask inspection, reading out said transferred pattern data being stored in said first memory means, and converting said read out pattern data into said reference data used for said comparing means.

12. A method as in claim 11 wherein said converting step comprises the steps of:

reading out said pattern data stored in said second memory means; and converting said second pattern data being stored in said memory means into said reference data used for mask inspecting, said pattern data stored in said first memory means being applied to said mask drawing apparatus before the pattern data is read out for mask inspecting.

* * * * *